United States Patent
Miki et al.

(10) Patent No.: US 11,382,329 B2
(45) Date of Patent: Jul. 12, 2022

(54) INSECTICIDE COMPOSITION

(71) Applicant: MITSUI CHEMICALS AGRO, INC., Tokyo (JP)

(72) Inventors: Ayaka Miki, Ako (JP); Shingo Nakano, Ako (JP); Hideo Tateishi, Ako (JP)

(73) Assignee: MITSUI CHEMICALS AGRO, INC., Tokyo (JP)

( * ) Notice: Subject to any disclaimer, the term of this patent is extended or adjusted under 35 U.S.C. 154(b) by 0 days.

(21) Appl. No.: 16/973,966

(22) PCT Filed: Jun. 14, 2019

(86) PCT No.: PCT/JP2019/023683
§ 371 (c)(1),
(2) Date: Dec. 10, 2020

(87) PCT Pub. No.: WO2019/240266
PCT Pub. Date: Dec. 19, 2019

(65) Prior Publication Data
US 2021/0251227 A1    Aug. 19, 2021

(30) Foreign Application Priority Data
Jun. 14, 2018  (JP) .............................. JP2018-113612

(51) Int. Cl.
*A01N 37/22*   (2006.01)
*A01N 25/06*   (2006.01)

(52) U.S. Cl.
CPC ............. *A01N 37/22* (2013.01); *A01N 25/06* (2013.01)

(58) Field of Classification Search
CPC ................. A61N 37/22; A01N 37/22
See application file for complete search history.

(56) References Cited

U.S. PATENT DOCUMENTS

| | | |
|---|---|---|
| 2011/0137068 A1 | 6/2011 | Aoki et al. |
| 2011/0201687 A1 | 8/2011 | Kobayashi et al. |
| 2013/0231392 A1 | 9/2013 | Kobayashi et al. |
| 2013/0310459 A1 | 11/2013 | Kobayashi et al. |
| 2014/0296560 A1 | 10/2014 | Aoki et al. |
| 2016/0262386 A1 | 9/2016 | Sikuljak et al. |
| 2016/0297750 A1 | 10/2016 | Aoki et al. |
| 2017/0367329 A1 | 12/2017 | Kobayashi et al. |
| 2018/0139960 A1 | 5/2018 | Sikuljak et al. |
| 2019/0166833 A1 | 6/2019 | Sikuljak et al. |
| 2019/0327970 A1 | 10/2019 | Tanaka et al. |

FOREIGN PATENT DOCUMENTS

| | | | |
|---|---|---|---|
| CN | 102740695 A | | 10/2012 |
| CN | 107306976 A | | 11/2017 |
| CN | 107529757 A | | 1/2018 |
| CN | 108077303 A | | 5/2018 |
| JP | 2005306753 A | | 11/2005 |
| JP | 2011157296 A | | 8/2011 |
| JP | 2016-88852 A | * | 5/2016 |
| JP | 2016088852 A | | 5/2016 |
| JP | 2016533378 A | | 10/2016 |
| WO | 2016/166252 A1 | | 10/2016 |
| WO | 2018/008727 A1 | | 1/2018 |
| WO | 2018/011056 A1 | | 1/2018 |

OTHER PUBLICATIONS

International Search Report (PCT/ISA/210) and an English translation thereof, and Written Opinion (PCT/ISA/237) dated Jul. 30, 2019, by the Japanese Patent Office as the International Searching Authority for International Application No. PCT/JP2019/023683.
First Office Action dated Jul. 7, 2021, by the State Intellectual Property Office of the People's Republic of China in corresponding Chinese Patent Application No. 201980039630.0 and an English translation of the Office Action. (15 pages).
Jeschke, P., "Latest generation of halogen-containing pesticides" doi: 10.1002/ps.4540, Jan. 2, 2017, 57 pages.
Office Action dated Dec. 2, 2021, by the Intellectual Property India, Government of India in corresponding ndian Patent Application No. 202017053768 and an English translation of the Office Action. (6 pages).
Notice of Reasons for Refusal dated Mar. 15, 2022, by the Japanese Patent Office in corresponding Japanese Patent Application No. 2018-113612 and an English translation of the Notice (6 pages).

\* cited by examiner

*Primary Examiner* — Benjamin J Packard
(74) *Attorney, Agent, or Firm* — Buchanan Ingersoll & Rooney PC

(57) ABSTRACT

The present invention pertains to an insecticide composition containing 2-fluoro-3-(N-methylbenzamide)-N-(2-bromo-6-trifluoromethyl-4-(heptafluoropropane-2-yl)phenyl)benzamide and a solubilizer having a c log P of 0.1-2.1.

6 Claims, No Drawings

INSECTICIDE COMPOSITION

TECHNICAL FIELD

The present invention relates to an insecticide composition, and particularly to an insecticide composition with excellent solubility of 2-fluoro-3-(N-methylbenzamide)-N-(2-bromo-6-trifluoromethyl-4-(heptafluoropropane-2-yl)phenyl)benzamide as an insecticidal component and having high insecticidal effects.

BACKGROUND ART

In order to increase insecticidal effects of an insecticide composition, it is necessary to sufficiently dissolve an insecticidal component in the composition. Therefore, it is practically important to appropriately select the type of a solubilizer that dissolves the insecticidal component in accordance with the type of the insecticide component to be used.

Examples of the typical insecticidal component include pyrethroid compounds. For example, Patent Literature 1 discloses an aerosol formulation containing: a pyrethroid compound, which is hardly soluble in kerosene, as an insecticidal component; and N,N-diethyl-m-toluamide, which is an aromatic amide compound, as a solubilizer of the pyrethroid compound.

In recent years, pests having gained resistance to insecticidal components such as the above pyrethroid compound have appeared. For example, it may be difficult to exterminate German cockroaches or common bed bugs which have gained resistance to the pyrethroid compound. In addition, repeating treatments with the drugs in order to exterminate pests that live in places where drugs hardly reach may also cause the development of the resistance. Therefore, new insecticidal components that exert insecticidal effects on pests having resistance to insecticidal components such as a pyrethroid compound have been studied.

One of the insecticidal components that exert the insecticidal effects as described above is 2-fluoro-3-(N-methylbenzamide)-N-(2-bromo-6-trifluoromethyl-4-(heptafluoropropane-2-yl)phenyl)benzamide. It has been confirmed that the insecticidal component shows a high fatality effect and persistence even for pests having gained resistance to insecticidal components such as a pyrethroid compound. However, the insecticidal component is hardly soluble and is inconvenient to be used in various dosage forms. Nevertheless, solubility of the insecticidal component has not been investigated.

CITATION LIST

Patent Literature

Patent Literature 1: JP-A-2005-306753

SUMMARY OF INVENTION

Technical Problem

The above 2-fluoro-3-(N-methylbenzamide)-N-(2-bromo-6-trifluoromethyl-4-(heptafluoropropane-2-yl)phenyl)benzamide has poor solubility in common solvents. Therefore, it is an object to improve the solubility thereof in order to form various dosage forms.

An object of the present invention is to dissolve 2-fluoro-3-(N-methylbenzamide)-N-(2-bromo-6-trifluoromethyl-4-(heptafluoropropane-2-yl)phenyl)benzamide in the composition sufficiently to provide an insecticide composition with high insecticidal effects.

Solution to Problem

As a result of intensive studies to solve the above problems, the present inventors have found that it is possible to dissolve 2-fluoro-3-(N-methylbenzamide)-N-(2-bromo-6-trifluoromethyl-4-(heptafluoropropane-2-yl)phenyl)benzamide in the composition sufficiently by using a solubilizer having a c log P within a specific range to provide an insecticide composition with high insecticidal effects, and the present invention has been completed.

That is, the present invention encompasses the following items.

(1) An insecticide composition containing 2-fluoro-3-(N-methylbenzamide)-N-(2-bromo-6-trifluoromethyl-4-(heptafluoropropane-2-yl)phenyl)benzamide, and a solubilizer having a c log P of 0.1 to 2.1.

(2) The insecticide composition according to the above (1) containing at least one of benzyl alcohol, N-methyl-2-pyrrolidone, 3-methoxy-N,N-dimethylpropionamide, isopropanol, and propylene glycol diacetate as the solubilizer.

(3) The insecticide composition according to the above (1) or (2) further containing ethanol as a solvent.

(4) An aerosol formulation containing the insecticide composition according to any one of the above (1) to (3) and a propellant.

(5) An insecticide method including administering the insecticide composition according to any one of the above (1) to (3) to pests.

Advantageous Effects of Invention

An insecticide composition of an embodiment of the present invention is possible to dissolve 2-fluoro-3-(N-methylbenzamide)-N-(2-bromo-6-trifluoromethyl-4-(heptafluoropropane-2-yl)phenyl)benzamide in the composition sufficiently since a solubilizer having a c log P within a specific range is used, and an insecticide composition with high insecticidal effects can be provided.

DESCRIPTION OF EMBODIMENTS

Hereinafter, a specific embodiment of the present invention will be described in detail. But the present invention is not limited to the following embodiment, and can be appropriately modified as long as the object of the present invention is achieved.

An insecticide composition of an embodiment of the present invention contains 2-fluoro-3-(N-methylbenzamide)-N-(2-bromo-6-trifluoromethyl-4-(heptafluoropropane-2-yl)phenyl)benzamide (also referred to as "compound A" below). As the compound A, Broflanilide (manufactured by MITSUI CHEMICALS AGRO, INC) and the like can be used.

A content of the compound A in the insecticide composition of the embodiment of the present invention is 0.1 to 90 mass %, preferably 0.5 to 80 mass %, and more preferably 1.0 to 70 mass %.

The insecticide composition of the embodiment of the present invention contains the compound A and a solubilizer having a c log P of 0.1 to 2.1. The solubilizer having the c log P within the above range enables the compound A to dissolve in the insecticide composition efficiently, and the insecticide composition is suitable for, for example, forming a liquid formulation, an aerosol formulation, a spray formulation, or the like.

The reason why the solubilizer increases the solubility of the compound A in the present invention is not clear, but the reason is presumed to be a good affinity between the solubilizer and a functional group of the compound A.

Here, the c log P refers to a scale representing the distribution of substances between an octanol phase and an aqueous phase. Specifically, the c log P is determined by breaking down a chemical structure of a compound into structural elements thereof and integrating a hydrophobic fragment constant (f value) of each fragment. The c log P can be calculated using, for example, a MedChem 1.01 software program (manufactured by Medicinal Chemistry Project, Pomona College, Pomona Calif.).

The c log P of the solubilizer in the present invention can be obtained from the ChemExper website (https://www.chemexper.com/) or the like.

The c log P of the solubilizer in the present invention is 0.1 to 2.1, preferably 0.15 to 1.4.

The solubilizer in the present invention is not particularly limited as long as the c log P of the solubilizer is within the above range and the solubilizer dissolves the compound A. However, like a solvent (a solid carrier, a liquid carrier, or a diluent) described below, those that mainly serve as a carrier for retaining an active component, or those that mainly serve as a diluent for diluting the compound A are excluded. Specific examples of the solubilizer include benzyl alcohol. N-methyl-2-pyrrolidone, 3-methoxy-N,N-dimethylpropionamide, propylene glycol diacetate, methyl acetate, ethyl acetate, butyl acetate, benzyl acetate, 1,2-dimethoxyethane, 1-propanol, isopropanol, 1-butanol, 4-methoxybenzyl alcohol, cinnamyl alcohol, phenol, tetrahydrofuran, and the like.

From the viewpoint of increasing the solubility of the compound A, preferred ones are benzyl alcohol, N-methyl-2-pyrrolidone, 3-methoxy-N,N-dimethylpropionamide, propylene glycol diacetate, methyl acetate, ethyl acetate, 1,2-dimethoxyethane, 1-propanol, isopropanol, 1-butanol, phenol, and tetrahydrofuran.

Among these compounds, more preferred ones are benzyl alcohol, N-methyl-2-pyrrolidone, 3-methoxy-N,N-dimethylpropionamide, 1,2-dimethoxyethane, isopropanol, phenol, and tetrahydrofuran.

Particularly preferred ones are benzyl alcohol, N-methyl-2-pyrrolidone, phenol, and tetrahydrofuran.

The insecticide composition of the embodiment of the present invention preferably contains at least one of benzyl alcohol. N-methyl-2-pyrrolidone, 3-methoxy-N,N-dimethylpropionamide, isopropanol, and propylene glycol diacetate among the above solubilizers, from the viewpoint of a high flash point, excellent safety, low toxicity, and low odor.

The solubilizer in the present invention is preferably a solubilizer capable of dissolving the compound A in an amount of 2.5 mass % or more, more preferably a solubilizer capable of dissolving the compound A in an amount of 5 mass % or more, still more preferably a solubilizer capable of dissolving the compound A in an amount of 10 mass % or more, and particularly preferably a solubilizer capable of dissolving the compound A in an amount of 20 mass % or more.

In the insecticide composition of the embodiment of the present invention, one of the above solubilizers may be used alone, or two or more thereof may be used in combination.

A content of the above solubilizer in the insecticide composition of the embodiment of the present invention is 0.1 to 90 mass %, preferably 1.0 to 60 mass %, and more preferably 2.0 to 50 mass %. The content of the above solubilizer may be 3.0 mass % or more or 4.0 mass % or more, and the content may be 40 mass % or less, 30 mass % or less, 20 mass % or less, or 10 mass % or less. When the content of the above solubilizer is within the above range, flammability, unpleasant odor and contamination of housing equipment due to use can be prevented.

A content ratio of the compound A to the above solubilizer in the insecticide composition of the embodiment of the present invention is 900:1 to 1:900 in terms of mass ratio, preferably 200:1 to 1:200, and more preferably 50:1 to 1:50. When the insecticide composition is used in the above range, a stable formulation can be obtained, and contamination of housing equipment and the like can be prevented.

The insecticide composition of the embodiment of the present invention may contain various solvents, insecticidal components such as a pyrethroid compound and a carbamate compound, repellents, synergists, antioxidants, emulsifiers, or the like, in addition to the compound A and the above solubilizer.

The solvent is distinguished from the solubilizer described above and means those that are used as a solid carrier, a liquid carrier, or a diluent. That is, the solvent means those that mainly serve as a carrier for retaining an active component, or mainly serve as a diluent for diluting the compound A. Those that mainly responsible for sufficiently dissolving the compound A, like the solubilizer described above, are excluded from the solvent. Examples of the solvent include: saturated hydrocarbon-based solvents such as ethanol, normal paraffin, isoparaffin, and naphthene; ethers such as dipropylene glycol monomethyl ether and 3-methoxy-3-methyl-1-butanol; water, and the like. One selected from these may be used alone, or two or more selected from these may be mixed and used. Among these, ethanol may be used.

Examples of the insecticidal component include: pyrethroid compounds such as allethrin, tetramethrin, prallethrin, phenothrin, resmethrin, cyphenothrin, permethrin, cypermethrin, deltamethrin, tralomethrin, cyfluthrin, furamethrin, imiprothrin, etofenprox, fenvalerate, fenpropathrin, silafluofen, metofluthrin, meperfluthrin, dimefluthrin, transfluthrin, and 2-methyl-4-oxo-3-(2-propynyl)-cyclopent-2-enyl-3-(2,2-dichlorovinyl)-2,2-dimethylcyclopropanecarboxylate; organophosphorus compounds such as dichlorvos, fenitrothion, tetrachlorovinphos, fenthion, chlorpyrifos, and diazinon; carbamate compounds such as propoxur, carbaryl, metoxadiazone, and fenobucarb; chitin synthesis inhibitors such as lufenuron, chlorfluazuron, hexaflumuron, diflubenzuron, cyromazine, and 1-(2,6-difluorobenzoyl)-3-[2-fluoro-4-(1,1,2,3,3,3-hexafluoropropoxy)phenyl]urea; juvenile hormone analogue such as pyriproxyfen, methoprene, hydroprene, and fenoxycarb; N-phenylpyrazole compounds such as fipronil, and the like.

Examples of the repellents include N,N-diethyl-m-toluamide, limonene, linalool, citronellal, menthol, menthone, hinokitiol, geraniol, eucalyptol, indoxacarb, carane-3,4-diol, 2-(2-hydroxyethyl)-1-piperidincarboxylic acid 1-methylpropyl ester, 3-(N-n-butyl-N-acetyl)aminopropionate ethyl ester, p-menthane-3,8-diol, and the like.

Examples of the synergists include piperonyl butoxide, MGK264, S421, IBTA, Sinepyrin 500, and the like.

Examples of the antioxidants include BHT, BHA, and the like, and examples of the emulsifiers include surfactants such as polyoxyethylene fatty acid esters, glycerin fatty acid esters, and sorbitan fatty acid esters, and the like.

The insecticide composition of the embodiment of the present invention is obtained by mixing the compound A, the solubilizer, and optionally other desired components at normal temperature or under heating conditions.

The insecticide composition of the embodiment of the present invention can be used as an aerosol formulation, a pumping formulation, a liquid formulation, a powder formulation, a heat transpiration formulation, and the like. Among these, it is preferable to use a dosage form whose droplets adhere to pests, such as the aerosol formulation, the pumping formulation, and the liquid formulation. The insecticide composition formed in such a dosage form exhibits the insecticidal effect efficiently.

Propellants such as liquefied petroleum gas, dimethyl ether, 1,3,3,3-tetrafluoropropene, nitrogen gas, and carbon dioxide gas may be used when the insecticide composition is used as the aerosol formulation.

The insecticide composition of the embodiment of the present invention can be administered to pests. Examples of the pests include: cockroaches such as German cockroaches, smokybrown cockroaches, American cockroaches, Japanese cockroaches, and brown cockroaches; fleas such as dog fleas and cat fleas; Hymenoptera such as bees and wasps; flies such as house flies and *Drosophila melanogasters*; myriapods such as pillbug, sow bugs, and Chinese red-headed centipedes; spiders such as redback spiders, house spiders, and jumping spiders; ants such as *Pristomyrmex punctatus, Formica japonica*, and argentine ants; termites such as *Reticulitermes speratus* and *Coptotermes formosanus*; stink bugs such as brown marmorated stink bugs, green shield bugs, whiteflies, and bed bugs; moths such as *Nephotettix cincticeps* and *Spodoptera litura*; mosquitoes such as common house mosquitoes and *Aedes albopictus*; mites such as ornithonyssus *bacoti*, Cheyletiella, Acaridae, Dermatophagoides, Cheyletiella, and ticks; and the like.

EXAMPLES

Hereinafter, the present invention will be further described with reference to Examples, but the present invention is not limited to the following Examples.

Test Example 1: Solubility Test

Examples 1 to 19 and Comparative Examples 1 to 8

As 2-fluoro-3-(N-methylbenzamide)-N-(2-bromo-6-trifluoromethyl-4-(heptafluoropropane-2-yl)phenyl)benzamide (compound A), Broflanilide (manufactured by MITSUI CHEMICALS AGRO, INC) was used for the test.

The solubilizers described in Table 1 were stirred to dissolve the compound A so that the concentrations of the compound A were 2.5 wt %, 5 wt %, 10 wt %, 20 wt %, 30 wt %, and 40 wt %. The results of the tests were shown in Table 1. The evaluation criteria of Table 1 are as follows.

(Evaluation Criteria)

○: Sufficiently dissolved, no residual solid contents x: Not completely dissolved, with residual solid contents

TABLE 1

| | Solubilizer | cLogP | Concentration of 2-fluoro-3-(N-methylbenzamide)-N-(2-bromo-6-trifluoromethyl-4-(heptafluoropropane-2-yl)phenyl)benzamide (wt %) | | | | | |
|---|---|---|---|---|---|---|---|---|
| | | | 2.5% | 5% | 10% | 20% | 30% | 40% |
| Example 1 | Benzyl alcohol | 1.358 | ○ | ○ | ○ | ○ | ○ | ○ |
| Example 2 | N-methyl-2-pyrrolidone | 0.853 | ○ | ○ | ○ | ○ | ○ | ○ |
| Example 3 | 3-methoxy-N, N-dimethylpropionamide | 0.192 | ○ | ○ | ○ | ○ | ○ | x |
| Example 4 | Isopropanol | 0.828 | ○ | ○ | ○ | ○ | ○ | x |
| Example 5 | Propylene glycol diacetate | 0.853 | ○ | ○ | ○ | ○ | x | x |
| Example 6 | Methyl acetate | 0.478 | ○ | ○ | ○ | ○ | x | x |
| Example 7 | Ethyl acetate | 0.914 | ○ | ○ | ○ | ○ | x | x |
| Example 8 | Butyl acetate | 1.842 | ○ | ○ | ○ | x | x | x |
| Example 9 | Benzyl acetate | 1.846 | ○ | ○ | ○ | x | x | x |
| Example 10 | 1,2-dimethoxyethane | 0.378 | ○ | ○ | ○ | ○ | ○ | x |
| Example 11 | Diethylene glycol monobutyl ether | 1.225 | ○ | ○ | x | x | x | x |
| Example 12 | Dipropylene glycol | 0.214 | ○ | x | x | x | x | x |
| Example 13 | Dipropylene glycol dimethyl ether | 1.242 | ○ | ○ | x | x | x | x |
| Example 14 | 1-propanol | 0.889 | ○ | ○ | ○ | ○ | x | x |
| Example 15 | 1-butanol | 1.353 | ○ | ○ | ○ | ○ | x | x |
| Example 16 | 4-methoxybenzyl alcohol | 1.253 | ○ | ○ | ○ | x | x | x |
| Example 17 | Cinnamyl alcohol | 2.028 | ○ | ○ | ○ | x | x | x |
| Example 18 | Phenol | 1.682 | ○ | ○ | ○ | ○ | ○ | ○ |
| Example 19 | Tetrahydrofuran | 0.881 | ○ | ○ | ○ | ○ | ○ | ○ |
| Comparative Example 1 | Diisopropyl ether | 2.12 | x | x | x | x | x | x |
| Comparative Example 2 | Glycerin | −1.077 | x | x | x | x | x | x |
| Comparative Example 3 | Diethylene glycol | −0.592 | x | x | x | x | x | x |
| Comparative Example 4 | Triethylene glycol | −0.655 | x | x | x | x | x | x |
| Comparative Example 5 | Propylene glycol | −0.124 | x | x | x | x | x | x |
| Comparative Example 6 | Limonene | 3.537 | x | x | x | x | x | x |
| Comparative Example 7 | Cineole | 2.395 | x | x | x | x | x | x |
| Comparative Example 8 | Toluene | 2.296 | x | x | x | x | x | x |

As shown in Table 1, in Examples in which a solubilizer having a c Log P of 0.1 to 2.1 was used, the desired amount (2.5 wt %) of the compound A could be dissolved in the composition.

In contrast, in Comparative Examples in which a solubilizer whose c Log P is not 0.1 to 2.1 was used, 2.5 wt % of the compound A could not be dissolved in the composition.

Test Example 2: Insecticidal Efficacy Test

Examples 20 to 24, Comparative Example 9, and Control Examples 1 to 5

(Preparation of Samples)

Components described in Table 2 were dissolved with stirring at room temperature (about 25° C.). Specifically, an ethanol solution containing 1.0 mass/volume % of the compound A and 5.0 mass/volume % of the solubilizer described in Table 2 was prepared. 105 mL of the above ethanol solution was filled with 345 mL of liquefied petroleum gas, and the mixture was used as an aerosol formulation.

(Insecticidal Efficacy Test)

A test was carried out according to the following procedures (i) to (iv).

(i) Test insects (smokybrown cockroaches: 10 adult females) were put into a plastic cup (diameter: 130 mm, height: 100 mm).

(ii) The cup containing the test insects was installed obliquely (at an angle of 45°) on a floor corner, and the sample was sprayed for one second from a position that is 50 cm away from the cup by using a quantitative spraying device.

(iii) After completion of the spray, the test insects were transferred to a clean container, and absorbent cotton containing water was put in the container.

(iv) The container stood at a test room at 25° C., the fatality number of the test insects after 24 hours was checked, and the fatality rate (%) was determined by the following formula.

Fatality rate (%)=(fatality number of test insects after 24 hours/number of test insects)×100

The above test was performed for three times, and an average value of the fatality rates (%) was shown in the following Table 2.

The spray amounts of the samples of Examples and Comparative Examples were as follows.

Example 20: 12.52 g/10 sec
Example 21: 12.24 g/10 sec
Example 22: 12.62 g/10 sec
Example 23: 13.40 g/10 sec
Example 24: 12.52 g/10 sec
Comparative example 9: 12.14 g/10 sec

TABLE 2

| | Solubilizer | cLogP | Example 20 | Example 21 | Example 22 | Example 23 | Example 24 (wt %) |
|---|---|---|---|---|---|---|---|
| Insecticidal component | 2-fluoro-3-(N-methylbenzamide)-N-(2-bromo-6-trifluoromethyl-4-(heptafluoropropane-2-yl)phenyl)benzamide | — | 1.0 | 1.0 | 1.0 | 1.0 | 1.0 |
| Solubilizer | Benzyl alcohol | 1.358 | 5.0 | — | — | — | — |
| | N-methyl-2-pyrrolidone | 0.853 | — | 5.0 | — | — | — |
| | 3-methoxy-N,N-dimethylpropionamide | 0.192 | — | — | 5.0 | — | — |
| | Isopropanol | 0.828 | — | — | — | 5.0 | — |
| | Propylene glycol diacetate | 0.853 | — | — | — | — | 5.0 |
| Solvent | Ethanol | — | Rest | | | | |
| | Total | | 100 | | | | |
| | Fatality rate (%) | | 93.3 | 100 | 96.7 | 100 | 93.3 |

| | Solubilizer | cLogP | Comparative Example 9 | Control Example 1 | Control Example 2 | Control Example 3 | Control Example 4 | Control Example 5 (wt %) |
|---|---|---|---|---|---|---|---|---|
| Insecticidal component | 2-fluoro-3-(N-methylbenzamide)-N-(2-bromo-6-trifluoromethyl-4-(heptafluoropropane-2-yl)phenyl)benzamide | — | 1.0 | — | — | — | — | — |
| Solubilizer | Benzyl alcohol | 1.358 | — | 5.0 | — | — | — | — |
| | N-methyl-2-pyrrolidone | 0.853 | — | — | 5.0 | — | — | — |
| | 3-methoxy-N,N-dimethylpropionamide | 0.192 | — | — | — | 5.0 | — | — |
| | Isopropanol | 0.828 | — | — | — | — | 5.0 | — |
| | Propylene glycol diacetate | 0.853 | — | — | — | — | — | 5.0 |
| Solvent | Ethanol | — | Rest | | | | | |
| | Total | | 100 | | | | | |
| | Fatality rate (%) | | 60.0 | 3.3 | 6.7 | 0 | 0 | 0 |

As is clear from the results of Table 2, excellent insecticidal effects were exhibited by using a solubilizer having a c Log P of 0.1 to 2.1.

Although the present invention has been described in detail using specific embodiments, it will be apparent to those skilled in the art that various modifications and variations are possible without departing from the spirit and scope of the present invention. The present application is based on a Japanese patent application (Japanese Patent Application No. 2018-113612) filed on Jun. 14, 2018, the entire contents of which are incorporated herein by reference.

The invention claimed is:

1. An insecticide composition comprising:
2-fluoro-3-(N-methylbenzamide)-N-(2-bromo-6-trifluoromethyl-4-(heptafluoropropane-2-yl)phenyl)benzamide; and
a solubilizer having a c log P of 0.1 to 2.1,
wherein the solubilizer is at least one selected from a group consisting of benzyl alcohol, 3-methoxy-N,N-dimethylpropionamide, and propylene glycol diacetate.

2. The insecticide composition according to claim 1, further comprising ethanol as a solvent.

3. An aerosol formulation comprising:
the insecticide composition according to claim 1; and
a propellant.

4. An insecticide method comprising administering the insecticide composition according to claim 1 to pests.

5. An aerosol formulation comprising:
the insecticide composition according to claim 2; and
a propellant.

6. An insecticide method comprising administering the insecticide composition according to claim 2 to pests.

* * * * *